Nov. 14, 1961     R. CHARBONNIER ET AL     3,008,332

SUPERSONIC PRESSURE GAUGE

Filed Jan. 28, 1959

United States Patent Office 3,008,332
Patented Nov. 14, 1961

3,008,332
SUPERSONIC PRESSURE GAUGE
Roger Charbonnier, Meudon-Bellevue, and Stéphane Estrabaud, Antony, France, assignors to Rochar Electronique, a corporation of France
Filed Jan. 28, 1959, Ser. No. 789,636
Claims priority, application France Feb. 1, 1958
2 Claims. (Cl. 73—398)

The present invention relates to a fluid column pressure-gauge the operation of which is based on the measurement of the propagation time of pressure waves, and more particularly of supersonic waves, between a given source and the meniscus formed by the pressure fluid in one or several manometric columns.

The novel application to pressure measurements of the well known general principles of the measurement of distances, thicknesses, depths, levels and other dimensions through reflection of supersonic waves, presents important commercial and technical advantages, especially on account of the precision inherent to such measurements and the possibility of readily transmitting and transforming the resulting indications for their utilization.

The invention will be best understood from the following description and appended drawings relating to the embodiments given by way of non limitative examples; in the drawings.

Figure 1:
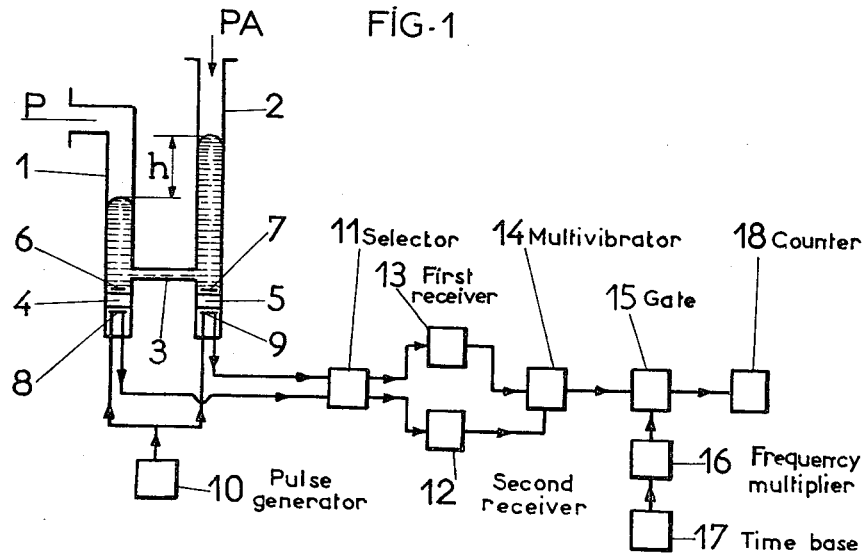
FIG. 1 is a block diagram of a mercury pressure-gauge according to a preferred embodiment of the invention.

Referring to FIG. 1, there is shown a pressure-gauge wherein the mercury in tube 1 is subjected to the pressure $p$ to be measured, whereas the mercury in tube 2, which communicates with tube 1 through conduit 3, is subjected to the atmospheric pressure $P_A$. This results in a level difference $h$, the value of which is to be converted into a pressure indication, according to the method of the invention.

At the lower end of tubes 1 and 2 are located two electro-acoustic transducer elements 4 and 5, respectively, made of quartz-crystal, for instance. The upper faces of these crystals, which may be formed with metallized coatings 6 and 7, are in contact wtih said liquid, whereas the lower metallized surfaces 8 and 9 are connected to a recurrent electric pulse generator 10 and to an electronic device 11 the function of which will be specified hereinafter.

Said device 11 is in turn connected to two receivers 12 and 13 the outputs of which are connected to a bistable multivibrator 14 the output of which is connected to one input of a gate circuit 15, a second input of which is connected to a time base generator 17 or, alternatively, and as shown in the figure, to a frequency multiplier 16 associated with the time base generator. The output of the gate circuit 15 is connected to a pulse counter 18.

The operation of the device shown in FIG. 1 is as follows: the current supersonic pulses produced by the quartz-crystals 4 and 5, which are energized by generator 10, propagate in the mercury contained in tubes 1 and 2, are reflected on the interface between the liquid surface and air and are converted by the crystals into electric pulses which are received on receivers 12 (corresponding to tube 1) and 13 (corresponding to tube 2) respectively. At each recurrence period of the train of pulses, multivibrator 14 is set in one of its stable states by the pulse derived from branch or tube 1 and is reset in its other stable state by the pulse derived from tube 2. The arrangement is such that, when multivibrator 14 is in its first state, gate 15 will transmit the time base pulses. Counter 18 counts the pulses thus transmitted, giving consequently an indication proportional to the difference between the respective periods of propagation of the supersonic pulses in branches 1 and 2, i.e. proportional to the level difference $h$ which meaures the pressure difference $(P_A-P)$.

The function of the electronic device 11 is to prevent the electric pulses derived from generator 10 from tripping multivibrator 14; many selecting devices are known which are adapted for selecting electric pulses according to the position of the latter in relation to time. More generally, the design and arrangement of the various electronic elements constituting the device in FIG. 1 are well known and a more detailed description thereof is therefore unnecessary.

A description of a particular embodiment of the manometric tubes 1 and 2, will now be given. The lower end of these tubes is shown, on a larger scale and in cross-section, in FIG. 3, wherein the same reference numbers designate the same elements as in FIG. 1.

Figure 3:
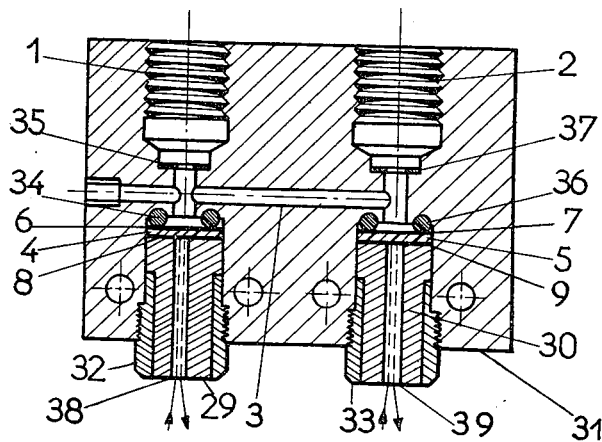
FIG. 3 is a sectional view of the portion of the manometric tubes enclosing the electro-acoustic transducers.

Electrodes 6, 8, 7 and 9, are formed, as shown in FIG. 3, by metallizing the crystal plates 4 and 5.

The tubes 1 2, 3, formed by separate elements, and elements 29 and 30 which support crystals 4 and 5 are embedded into a metal block 31. Nuts 32, 33 are adapted to ensure a tight locking and centering of said clamping elements 29 and 30. Sealing joints 34, 35, 36 and 37 are also provided. Clamps 29 and 30 are provided with central bores 38 and 39, respectively, for the connection leads of crystal plates 4 and 5.

It will be noted that certain known level measuring devices which make use of supersonic waves may be applied to pressure measurements: in this case, the echo of supersonic pulses on the meniscus of a single tube, such as tube 1, is used and the opening of a gate, such as gate 15, is initiated at fixed moments of the pulse recurrence period, while the closing thereof is controlled by the echoes.

However, this application of a conventional apparatus to pressure measurements would provide results which are much less accurate than those obtained by means of the device according to the present invention. Actually, when a single tube is used temperature variations cause variations in the level of the mercury contained in the tube, which results in measurement errors: the latter are suppressed to a substantial degree in the case of the invention, on account of the fact that a level difference $h$ is measured between branches 1 and 2 and that the variations of $h$ at at constant pressure and variable temperature correspond only to the difference in the volumes of mercury in branches 1 and 2.

In addition, since a level difference is measured, there is no need to calibrate the tubes and to determine exactly the volume of the liquid. When only one tube is used, the evaporation of the pressure fluid from any tube or the accidental spilling thereof effects the measuring results. Also the diameter of the tube would have to be perfectly uniform in order to obtain measurements with a precision say up to one millimeter, while the same result is readily achieved by means of the differential measurement according to the invention.

Referring again to FIG. 1, it will be apparent that if the time base circuit 17 operates at a fixed frequency, the variations of the propagation velocity of the supersonic waves in mercury, due to temperature variations, will affect the measurement result to a degree which cannot be disregarded.

According to the invention, the effects of the various causes of errors mentioned above are compensated. To this end a time base is used, the frequency of which varies as a function of temperature in such a manner as to compensate for the variations, at a constant pressure, of the difference of the propagation times of the echoes in branches 1 and 2: for example, when the propagation time increases, the time base frequency decreases in such a manner that the number of the pulses transmitted through gate 15 during each cycle should always be the same for a given pressure.

Such a compensation may be obtained, for example, by using in the time base circuit, thermistors calibrated for varying the time base frequency as a function of temperature.

Figure 2:
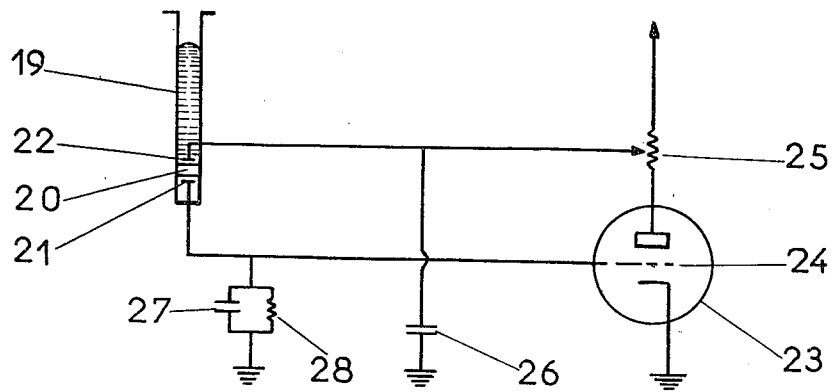
FIG. 2 illustrates an improved time base generator.

A particularly simple embodiment of a variable frequency time base, adapted to compensate the effect of the variations in the propagation time of the supersonic waves in mercury as a function of temperature, is illustrated in FIG. 2.

This device comprises essentially a mercury filled tube 19 having at its bottom, a quartz crystal 20 one electrode of which is connected to grid 24 of a vacuum tube 23, its other electrode 22 being connected to a resistor 25 and a capacitor 26 of the anode circuit of tube 23. The grid circuit of this tube also comprises a further capacitor 27 and a resistor 28. Tube 23 and the associated circuits constitute a piezoelectric oscillator arrangement of a conventional type, having the particular feature consisting in its oscillation frequency being determined by the resonance of the acoustic unit built up by the crystal and by the mercury column with which it is in contact. This resonance frequency decreases when, on account of a temperature increase, the propagation velocity of the pressure waves in the mercury decreases: by giving the mercury column suitable dimensions, this decrease may be substantially made to compensate for the corresponding increase in the opening time of gate 15 and thus the number of the pulses transmitted to counter 18 will remain constant for a given value of the pressure.

It is to be understood that the embodiments described are not limitative and are given only by way of example.

In particular, it may be noted that with the device in FIG. 1 may be associated any device of known type adapted to convert the indication of the pulse counter 18 into printed, typewritten, band perforated, etc., informations, or to cause this information to be transmitted at a distance.

What is claimed is:
1. A pressure-gauge comprising first and second manometric branch tubes containing a pressure wave-conducting pressure fluid; means for connecting said branch tubes to each other; two devices, immersed in the fluid in the two respective branches, for generating and receiving pressure wave pulses; a time-base generator having an output and delivering at said output recurrent electric pulses; an electronic gate having first and second inputs and an output, said first input being connected to the output of the time-base generator and the output of the electronic gate being connected to a pulse counter; trigger means having first and second inputs and an output, said output being connected to the second input of said gate, the first input of the trigger means being connected to the generating and receiving device in said first branch and the second input of the trigger means being connected to the generating and receiving device in said second branch.

2. A pressure-gauge according to claim 1, in which said time-base generator comprises an oscillator circuit including a quartz crystal, a tube containing a column of said pressure fluid, said quartz crystal being immersed in said column of fluid.

References Cited in the file of this patent
UNITED STATES PATENTS

| | | |
|---|---|---|
| 2,118,229 | Reynolds | May 24, 1938 |
| 2,746,295 | Lubkin | May 22, 1956 |
| 2,775,748 | Rod et al. | Dec. 25, 1956 |

OTHER REFERENCES

Article entitled "How Echo-Type Gages Measure Tank Levels," from The Oil & Gas Journal, vol. 54, No. 39, pages 275 and 278, Jan. 30, 1956, classified 73/290.